(12) United States Patent
Lee et al.

(10) Patent No.: US 12,360,700 B2
(45) Date of Patent: Jul. 15, 2025

(54) STORAGE DEVICE AND A VEHICLE INCLUDING THE STORAGE DEVICE

(71) Applicant: Samsung Electronics Co., Ltd., Suwon-si (KR)

(72) Inventors: Seung Han Lee, Suwon-si (KR); Dong Ouk Moon, Seongnam-si (KR); Hyun Joon Yoo, Suwon-si (KR); Kyoung Eun Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/961,972

(22) Filed: Oct. 7, 2022

(65) Prior Publication Data

US 2023/0229349 A1    Jul. 20, 2023

(30) Foreign Application Priority Data

Jan. 17, 2022 (KR) .......................... 10-2022-0006663

(51) Int. Cl.
    *G06F 3/06*             (2006.01)

(52) U.S. Cl.
    CPC .......... *G06F 3/0656* (2013.01); *G06F 3/0658* (2013.01); *G06F 3/0679* (2013.01); *G06F 3/0604* (2013.01)

(58) Field of Classification Search
None
See application file for complete search history.

(56) References Cited

U.S. PATENT DOCUMENTS

| | | | |
|---|---|---|---|
| 6,429,990 B2 * | 8/2002 | Serrano | G11B 19/04 360/60 |
| 6,975,476 B1 | 12/2005 | Berding | |
| 7,417,823 B2 | 8/2008 | Lim et al. | |
| 2007/0089011 A1 * | 4/2007 | Dodeja | G05B 23/0235 714/742 |
| 2008/0130156 A1 * | 6/2008 | Chu | G11B 20/18 |
| 2019/0339755 A1 * | 11/2019 | Chai | G06F 1/305 |
| 2019/0385383 A1 * | 12/2019 | Sato | G07C 5/0866 |
| 2020/0132712 A1 * | 4/2020 | Kim | G06F 3/14 |
| 2020/0250901 A1 * | 8/2020 | Golov | B60R 21/0134 |
| 2020/0250902 A1 | 8/2020 | Golov | |

(Continued)

FOREIGN PATENT DOCUMENTS

JP          H10-208438 A      8/1998

*Primary Examiner* — Michael Alsip
(74) *Attorney, Agent, or Firm* — Harness, Dickey & Pierce, P.L.C.

(57) ABSTRACT

A storage device comprises first and second storage devices mounted on respective first and second PCBs (Printed Circuit Boards) that are separated from each other, the first and second PCBs configured to store different data. The first storage device includes a first storage controller, and a first shock sensor that senses an impact of the first storage device to output a first sensor signal. The second storage device includes a second shock sensor different from the first shock sensor, and senses an impact of the second storage device to output a second sensor signal. The first storage controller outputs a first internal control signal that controls an internal operation of the first storage device based on the first sensor signal. The first storage device and the second storage device transmit data to each other based on the first sensor signal and the second sensor signal.

18 Claims, 10 Drawing Sheets

(56) References Cited

U.S. PATENT DOCUMENTS

| | | | |
|---|---|---|---|
| 2021/0011649 A1* | 1/2021 | Doshi | G06F 3/0604 |
| 2021/0048949 A1* | 2/2021 | Kale | G06Q 10/20 |
| 2021/0049479 A1* | 2/2021 | Kale | G06N 3/088 |
| 2021/0097782 A1* | 4/2021 | Dunning | G01H 1/003 |

* cited by examiner

FIG. 5

| Sgn_S  | Status    | Sgn_IC | Storage           |
|--------|-----------|--------|-------------------|
| LOW    | Normal    | IC_1   | Normal Mode       |
| MIDDLE | Caution   | IC_2   | Data Flush        |
| HIGH   | Emergency | IC_3   | Data Transmission |

FIG. 9

| Sgn_T | Temperature | Sgn_IC | Storage |
|---|---|---|---|
| LOW | T<T1 | IC_1 | Normal Mode |
| MIDDLE | T1<T<T2 | IC_2 | Data Flush |
| HIGH | T>T2 | IC_3 | Data Transmission |

STORAGE DEVICE AND A VEHICLE INCLUDING THE STORAGE DEVICE

CROSS-REFERENCE TO RELATED APPLICATION

This application claims priority from Korean Patent Application No. 10-2022-0006663, filed on Jan. 17, 2022, in the Korean Intellectual Property Office, the disclosure of which is incorporated herein by reference in their entirety.

BACKGROUND

1. Technical Field

The present inventive concepts relates to storage devices and vehicles including one or more of the storage devices. Specifically, the present inventive concepts relate to storage devices including a shock sensor and vehicles including one or more of the storage devices.

2. Description of the Related Art

In addition to the dramatic development of semiconductor devices, an autonomous driving vehicle technology using them is being developed together.

In particular, as autonomous driving vehicles are gradually commercialized, there is a need for a data preservation method for special situations such as a collision accident.

SUMMARY

Some example embodiments of the present inventive concepts provide a storage device capable of protecting data and generating a signal for vehicle control in the event of an emergency situation such as a vehicle collision, in an autonomous driving vehicle.

Some example embodiments of the present inventive concepts also provide a vehicle including a storage device capable of protecting data and generating a signal for vehicle control in the event of an emergency situation such as a vehicle collision, in an autonomous driving vehicle.

According to some example embodiments of the present inventive concepts, there is provided storage device comprising a first storage device mounted on a first PCB (Printed Circuit Board), and a second storage device which is mounted on a second PCB separated from the first PCB and stores data different from data stored in the first storage device, wherein the first storage device includes a first storage controller, and a first shock sensor that senses an impact of the first storage device to output a first sensor signal, the second storage device includes a second shock sensor that is different from the first shock sensor, and senses an impact of the second storage device to output a second sensor signal, the first storage controller outputs a first internal control signal that controls an internal operation of the first storage device on the basis of the first sensor signal, and the first storage device and the second storage device transmit data to each other on the basis of the first sensor signal and the second sensor signal.

According to some example embodiments of the present inventive concepts, there is provided storage device comprising a shock sensor configured to detect an external impact and outputs a sensor signal, a storage controller configured to output an internal control signal to control an internal operation on the basis of the sensor signal, a buffer memory configured to temporarily store data on the basis of the internal control signal or transmits the temporarily stored data, and a non-volatile memory of a SSD (Solid State Drive), wherein the storage controller outputs a first internal control signal on the basis of the sensor signal, the non-volatile memory and the buffer memory are controlled by the first internal control signal.

According to some example embodiments of the present inventive concepts, there is a provided vehicle comprising an electronic control unit, and first and second storage devices connected to the electronic control unit, wherein the first storage device is mounted on a first PCB (Printed Circuit Board), the second storage device is mounted on a second PCB separated from the first PCB, and stores data different from data stored in the first storage device, the first storage device includes a first storage controller, and a first shock sensor which senses an impact of the first storage device to output a first sensor signal, the second storage device includes a second shock sensor which is different from the first shock sensor, and senses an impact of the second storage device to output a second sensor signal, the first storage controller outputs an internal control signal which controls an internal operation of the first storage device on the basis of the first sensor signal, and the first storage device and the second storage device transmit data to each other on the basis of the first sensor signal and the second sensor signal.

However, some example embodiments of the present inventive concepts are not restricted to the one set forth herein. The above and other some example embodiments of the present inventive concepts will become more apparent to one of ordinary skill in the art to which the present inventive concepts pertains by referencing the detailed description of the present inventive concepts given below.

BRIEF DESCRIPTION OF THE DRAWINGS

FIG. 5 is a table for explaining the operation of the storage device according to some example embodiments of the present inventive concepts.

FIG. 9 is a table for explaining the operation of the storage device according to some example embodiments of the present inventive concepts.

DETAILED DESCRIPTION

Figure 1:
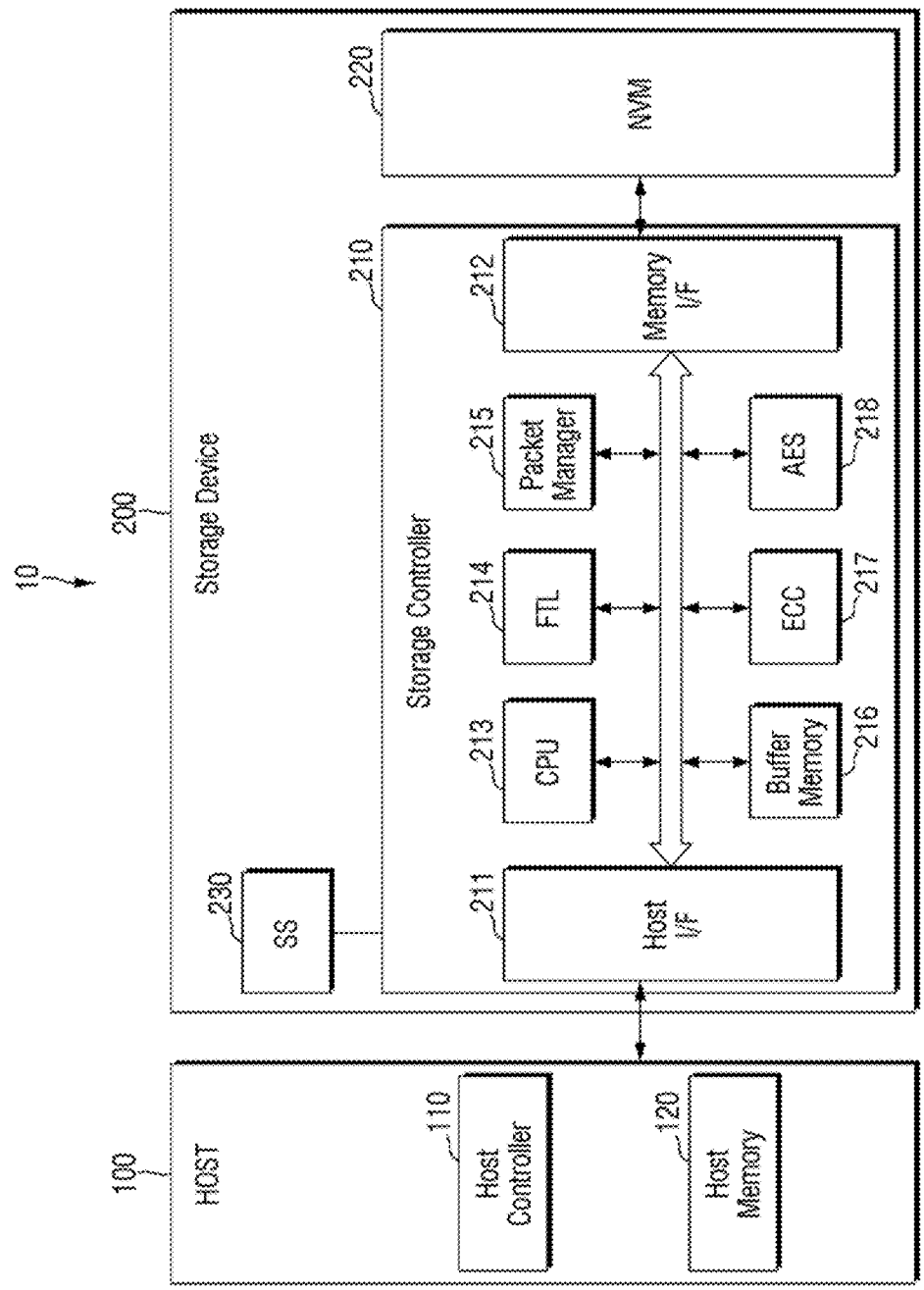
FIG. 1 is a block diagram schematically showing a host-storage system according to some example embodiments of the present inventive concepts.

Hereinafter, some example embodiments according to the technical idea of the present inventive concepts will be described referring to the accompanying drawings.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed "by" performing additional operations, it will be understood that the operation may be performed "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.).

FIG. 1 is a block diagram schematically showing a host-storage system according to some example embodiments of the present inventive concepts.

Referring to FIG. 1, a host-storage system 10 may include a host 100 and a storage device 200. The storage device 200 may also include a storage controller 210 and a non-volatile memory (NVM) 220. Further, in some example embodiments, the host 100 may include a host controller 110 and a host memory 120. The host memory 120 may function as a buffer memory for temporarily storing the data to be transmitted to the storage device 200 or the data transmitted from the storage device 200.

The storage device 200 may include storage mediums for storing data in response to a request from the host 100. For example, the storage device 200 may include at least one of an SSD (Solid State Drive), an embedded memory, or a detachable external memory. When the storage device 200 is a SSD, the storage device 200 may be a device that complies with a non-volatility memory express (NVMe) standard.

When the storage device 200 is an embedded memory or an external memory, the storage device 200 may be a device that complies with a UFS (universal flash storage) or an eMMC (embedded multi-media card) standard. The host 100 and the storage device 200 may each generate and transmit packets according to the adopted standard protocol.

When the non-volatile memory 220 of the storage device 200 includes a flash memory, such a flash memory may include a 2D NAND memory array or a 3D (or vertical) NAND (VNAND) memory array. As another example, the storage device 200 may include different various types of non-volatile memories. For example, a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), and various other types of memories may be adopted as the storage device 200.

In some example embodiments, the host controller 110 and the host memory 120 may be implemented as separate semiconductor chips. Further, in some example embodiments, the host controller 110 and the host memory 120 may be integrated on the same semiconductor chip. As an example, the host controller 110 may be any one of a plurality of modules provided in the application processor, and such an application processor may be implemented as a system on chip (SoC). Further, the host memory 120 may be an embedded memory provided inside the application processor, or a non-volatile memory or a memory module placed outside the application processor.

The host controller 110 may manage an operation of storing data (for example, write data) of a buffer region in the non-volatile memory 220 or storing data (for example, read data) of the non-volatile memory 220 in the buffer region.

The storage controller 210 may include a host interface 211, a memory interface 212, and a CPU (central processing unit) 213. Also, the storage controller 210 may further include a flash translation layer (FTL) 214, a packet manager 215, a buffer memory 216, an ECC (error correction code) 217 engine, and an AES (advanced encryption standard) 218 engine.

The storage controller 210 may further include a working memory (not shown) into which the flash translation layer (FTL) 214 is loaded, and when the CPU 213 executes the flash translation layer 214, the data write and read operations on the non-volatile memory may be controlled.

The host interface 211 may transmit and receive packets to and from the host 100. The packets transmitted from the host 100 to the host interface 211 may include a command, data to be written in the non-volatile memory 220, or the like. The packets transmitted from the host interface 211 to the host 100 may include a response to the command, data that is read from the non-volatile memory 220, and the like.

The memory interface 212 may transmit the data to be written in the non-volatile memory 220 to the non-volatile memory 220 or receive the data that is read from the non-volatile memory 220. Such a memory interface 212 may be implemented to comply with standard protocols such as Toggle or ONFI.

The flash translation layer 214 may perform various functions such as address mapping, wear-leveling, and garbage collection. The address mapping operation is an operation of changing a logical address received from a host into a physical address which is used for actually storing the data in the non-volatile memory 220. The wear-leveling is a technique for ensuring that blocks in the non-volatile memory 220 are used uniformly to reduce or prevent an excessive degradation of a particular block, and may be implemented, for example, through a firmware technique for balancing the erasure counts of the physical blocks. The garbage collection is a technique for ensuring an available capacity in the non-volatile memory 220 through a method of copying the valid data of the block to a new block and then erasing the existing block.

The packet manager 215 may generate a packet according to the protocol of the interface discussed with the host 100, or may parse various types of information from the packet received from the host 100.

The buffer memory 216 may temporarily store the data to be written in the non-volatile memory 220 or the data to be read from the non-volatile memory 220. The buffer memory 216 may be configured to be provided inside the storage controller 210, but may be placed outside the storage controller 210.

The ECC engine 217 may perform error detection and correction functions on the read data that is read from the non-volatile memory 220. More specifically, the ECC engine 217 may generate parity bits for the write data to be written on the non-volatile memory 220, and the parity bits thus generated may be stored in the non-volatile memory 220 together with the write data. When reading the data from the non-volatile memory 220, the ECC engine 217 may correct an error of the read data, using the parity bits that are read from the non-volatile memory 220, together with the read data, and may output the read data with a corrected error.

The AES engine 218 may perform at least one of an encryption operation or a decryption operation on the data which is input to the storage controller 210, using a symmetric-key algorithm.

The shock sensor 230 may detect (e.g., "sense") the impact of the storage device 200 to output (e.g., generate, transmit to an external device, etc.) a sensor signal. As described herein, a detection or sensing of an impact of a device may be understood include detecting or sensing an impact of the device with an external element, a transmission of a physical or mechanical shock to the device, or the lick. Such a detection or sensing of the impact, shock, or the like may include detecting a sudden acceleration of the device (e.g., an acceleration having a magnitude above a threshold acceleration magnitude). For example, the shock sensor 230 may include an accelerometer that detects (e.g., senses) an impact of the storage device 200 based on detecting an acceleration of the shock sensor 230 having a magnitude that exceeds a predetermined threshold acceleration magnitude and/or an acceleration having a duration that is less than a predetermined threshold duration magnitude, and the shock sensor 230 may output (e.g., generate, transmit to an external device, etc.) a sensor signal in response to detecting the impact of the storage device 200. The shock sensor 230 provides (e.g., outputs, also referred to herein interchangeably as generates, transmits, or the like) the output sensor signal to the storage controller 210, and may cause the storage controller 210 to output (e.g., generate, transmit to an external device, etc.) an internal control signal for controlling the internal configuration. The specific contents will be described below.

In some example embodiments, although the shock sensor 230 is not included in the storage controller 210 and is shown as an independent configuration in FIG. 1, the present inventive concepts are not limited thereto, and the shock sensor 230 may be included in the storage controller 210 according to some example embodiments.

Figure 2:
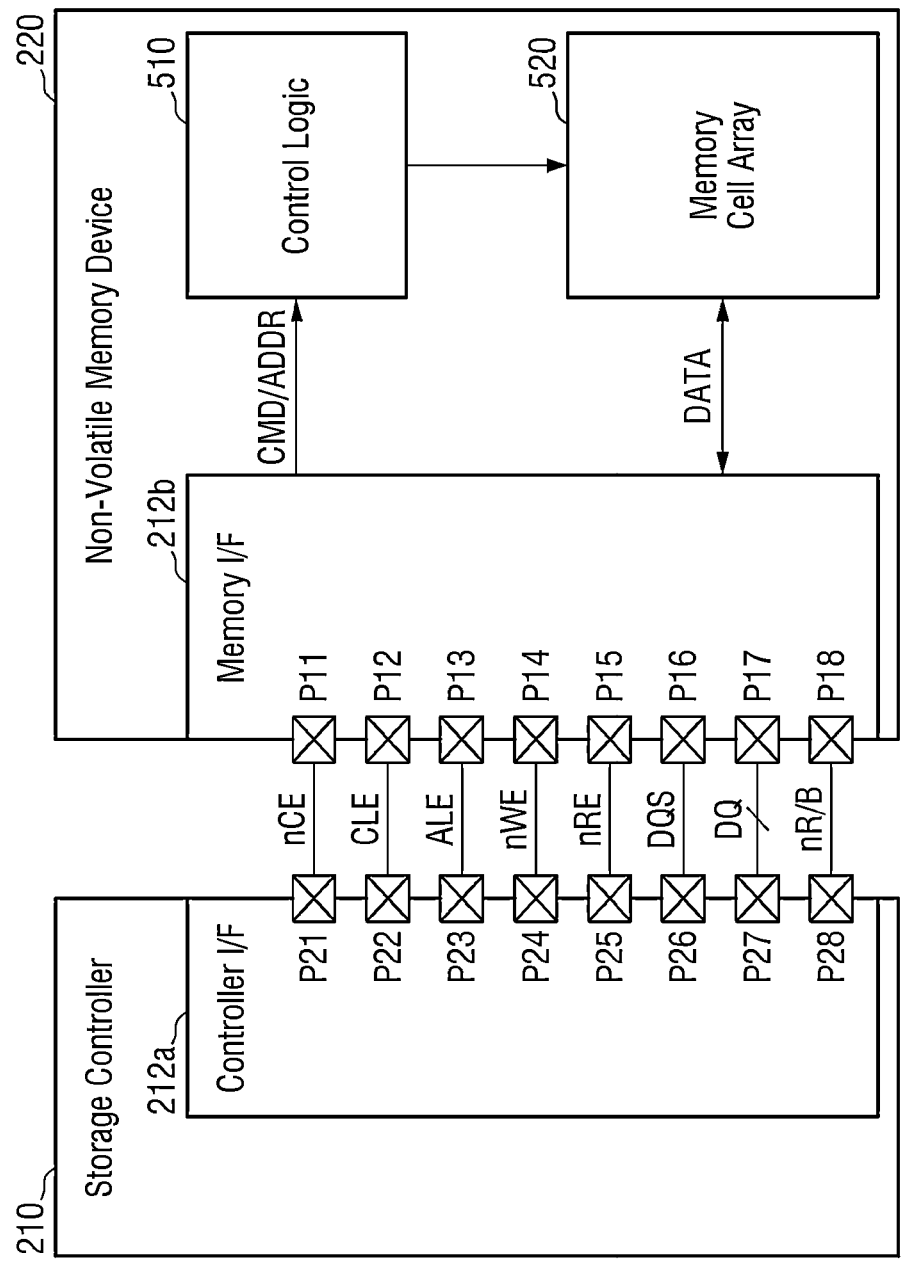
FIG. 2 is a diagram showing the storage controller, the memory interface, and the non-volatile memory of FIG. 1 in a reconfigured manner.

FIG. 2 is a diagram showing the storage controller, the memory interface, and the non-volatile memory of FIG. 1 in a reconfigured manner.

Referring to FIG. 2, the memory interface 212 of FIG. 1 may include the controller interface circuit 212a and the memory interface circuit 212b of FIG. 2.

The non-volatile memory 220 may include first to eighth pins P11 to P18, a memory interface circuit 212b, a control logic circuit 510, and a memory cell array 520.

The memory interface circuit 212b may receive a chip enable signal nCE from the storage controller 210 through a first pin P11. The memory interface circuit 212b may transmit and receive signals to and from the storage controller 210 through second to eighth pins P12 to P18 according to the chip enable signal nCE. For example, when the chip enable signal nCE is in an enable status (e.g., a low level), the memory interface circuit 212b may transmit and receive signals to and from the storage controller 210 through second to eighth pins P12 to P18.

The memory interface circuit 212b may receive a command latch enable signal CLE, an address latch enable signal ALE, and a write enable signal nWE from the storage controller 210 through the second to fourth pins P12 to P14. The memory interface circuit 212b may receive a data signal DQ from the storage controller 210 or transmit the data signal DQ to the storage controller 210 through a seventh pin P17. The command CMD, the address ADDR, and the data DATA may be transferred through the data signal DQ. For example, the data signal DQ may be transferred through a plurality of data signal lines. In this case, the seventh pin P17 may include a plurality of pins corresponding to the plurality of data signals.

The memory interface circuit 212b may acquire the command CMD from the data signal DQ received in an enable section (e.g., a high level status) of the command latch enable signal CLE on the basis of (e.g., based on) toggle timings of the write enable signal nWE. The memory interface circuit 212b may acquire the address ADDR from the data signal DQ received in the enable section (e.g., the high level status) of the address latch enable signal ALE on the basis of the toggle timings of the write enable signal nWE.

In some example embodiments, the write enable signal nWE maintains a static status (e.g., a high level or a low level) and then may be toggled between the high level and the low level. For example, the write enable signal nWE may be toggled at a section in which the command CMD or the address ADDR is transmitted. Accordingly, the memory interface circuit 212b may acquire the command CMD or the address ADDR on the basis of the toggle timings of the write enable signal nWE.

The memory interface circuit 212b may receive a read enable signal nRE from the storage controller 210 through a fifth pin P15. The memory interface circuit 212b may receive the data strobe signal DQS from the storage controller 210 through a sixth pin P16, or may transmit the data strobe signal DQS to the storage controller 210.

In a data DATA output operation of the non-volatile memory 220, the memory interface circuit 212b may receive the toggling read enable signal nRE through the fifth pin P15 before output of the data DATA. The memory interface circuit 212b may generate the toggling data strobe signal DQS on the basis of toggling of the read enable signal nRE. For example, the memory interface circuit 212b may generate the data strobe signal DQS that starts to toggle after a predetermined delay (e.g., tDQSRE) on the basis of the toggling start time of the read enable signal nRE. The memory interface circuit 212b may transmit a data signal DQ including the data DATA on the basis of the toggle timing of the data strobe signal DQS. Accordingly, the data DATA may be arranged at the toggle timing of the data strobe signal DQS and transmitted to the storage controller 210.

In a data DATA input operation of the non-volatile memory 220, when the data signal DQ including the data DATA is received from the storage controller 210, the memory interface circuit 212b may receive the toggling data strobe signal DQS together with the data DATA from the storage controller 210. The memory interface circuit 212b may acquire the data DATA from the data signal DQ, on the basis of the toggle timing of the data strobe signal DQS. For example, the memory interface circuit 212b may acquire the data DATA, by sampling the data signal DQ at a rising edge and a falling edge of the data strobe signal DQS.

The memory interface circuit 212b may transmit a ready/busy output signal nR/B to the storage controller 210 through an eighth pin P18. The memory interface circuit 212b may transmit the status information of the non-volatile memory 220 to the storage controller 210 through the ready/busy output signal nR/B. When the non-volatile memory 220 is in a busy status (that is, when the internal operations of the non-volatile memory 220 are being performed), the memory interface circuit 212b may transmit the ready/busy output signal nR/B indicating the busy status to the storage controller 210. When the non-volatile memory 220 is in a ready status (i.e., the internal operations of the non-volatile memory 220 are not performed or are completed), the memory interface circuit 212b may transmit the ready/busy output signal nR/B indicating the ready status to the storage controller 210.

For example, while the non-volatile memory 220 reads the data DATA from the memory cell array 520 in response to a page read command, the memory interface circuit 212b may transmit the ready/busy output signal nR/B indicating the busy status (e.g., a low level) to the storage controller 210. For example, while the non-volatile memory 220 programs the data DATA into the memory cell array 520 in response to the program instruction, the memory interface circuit 212b may transmit the ready/busy output signal nR/B indicating the busy status to the storage controller 210.

The control logic circuit 510 may generally control various operations of the non-volatile memory 220. The control logic circuit 510 may receive the command/address CMD/ADDR acquired from the memory interface circuit 212b.

The control logic circuit 510 may generate control signals for controlling other constituent elements of the non-volatile memory 220 according to the received command/address CMD/ADDR. For example, the control logic circuit 510 may generate various control signals for programing the data DATA in the memory cell array 520 or reading the data DATA from the memory cell array 520

The memory cell array 520 may store the data DATA acquired from the memory interface circuit 212*b* according to the control of the control logic circuit 510. The memory cell array 520 may output the stored data DATA to the memory interface circuit 212*b* according to the control of the control logic circuit 510.

The memory cell array 520 may include a plurality of memory cells. For example, the plurality of memory cells may be flash memory cells. However, the present inventive concepts are not limited thereto, and the memory cells may be a RRAM (Resistive Random Access Memory) cell, a FRAM (Ferroelectric Random Access Memory) cell, a PRAM (Phase Change Random Access Memory) cell, a TRAM (Thyristor Random Access Memory) cell, and a MRAM (Magnetic Random Access Memory) cell. Hereinafter, embodiments of the present inventive concepts will be described on the basis of an example in which the memory cells are the NAND flash memory cells.

The storage controller 210 may include first to eighth pins P21 to P28, and a controller interface circuit 212*a*. The first to eighth pins P21 to P28 may correspond to the first to eighth pins P11 to P18 of the non-volatile memory 220.

The controller interface circuit 212*a* may transmit the chip enable signal nCE to the non-volatile memory 220 through a first pin P21. The controller interface circuit 212*a* may transmit and receive signals to and from the selected non-volatile memory 220, which is through the chip enable signal nCE, through the second to eighth pins P22 to P28.

The controller interface circuit 212*a* may transmit the command latch enable signal CLE, the address latch enable signal ALE, and the write enable signal nWE to the non-volatile memory 220 through the second to fourth pins P22 to P24. The controller interface circuit 212*a* may transmit the data signal DQ to the non-volatile memory 220 through a seventh pin P27 or receive the data signal DQ from the non-volatile memory 220.

The controller interface circuit 212*a* may transmit the data signal DQ including the command CMD or the address ADDR, along with the toggling write enable signal, to the non-volatile memory 220. The controller interface circuit 212*a* may transmit the data signal DQ including the command CMD to the non-volatile memory 220 by transmitting the command latch enable signal CLE having the enable status, and may transmit the data signal DQ including the address ADDR to the non-volatile memory 220 by transmitting the address latch enable signal ALE having the enable status.

The controller interface circuit 212*a* may transmit the read enable signal nRE to the non-volatile memory 220 through a fifth pin P25. The controller interface circuit 212*a* may receive the data strobe signal DQS from the non-volatile memory 220 through a sixth pin P26, or may transmit the data strobe signal DQS to the non-volatile memory 220.

In the data DATA output operation of the non-volatile memory 220, the controller interface circuit 212*a* may generate a toggling read enable signal nRE and transmit the read enable signal nRE to the non-volatile memory 220. For example, the controller interface circuit 212*a* may generate the read enable signal nRE that changes from the static status (e.g., a high level or a low level) to the toggle status, before the data DATA is output. Accordingly, the toggling data strobe signal DQS may be generated in the non-volatile memory 220 on the basis of the read enable signal nRE. The controller interface circuit 212*a* may receive the data signal DQ including the data DATA together with the toggling data strobe signal DQS, from the non-volatile memory 220. The controller interface circuit 212*a* may acquire the data DATA from the data signal DQ on the basis of the toggle timing of the data strobe signal DQS.

In the data DATA input operation of the non-volatile memory 220, the controller interface circuit 212*a* may generate a toggling data strobe signal DQS. For example, the controller interface circuit 212*a* may generate the data strobe signal DQS that changes from the static status (e.g., a high level or a low level) to the toggle status before transmitting the data DATA. The controller interface circuit 212*a* may transmit the data signal DQ including the data DATA to the non-volatile memory 220 on the basis of the toggle timings of the data strobe signal DQS.

The controller interface circuit 212*a* may receive a ready/busy output signal nR/B from the non-volatile memory 220 through an eighth pin P28. The controller interface circuit 212*a* may discriminate the status information of the non-volatile memory 220 on the basis of the ready/busy output signal nR/B.

Figure 3:
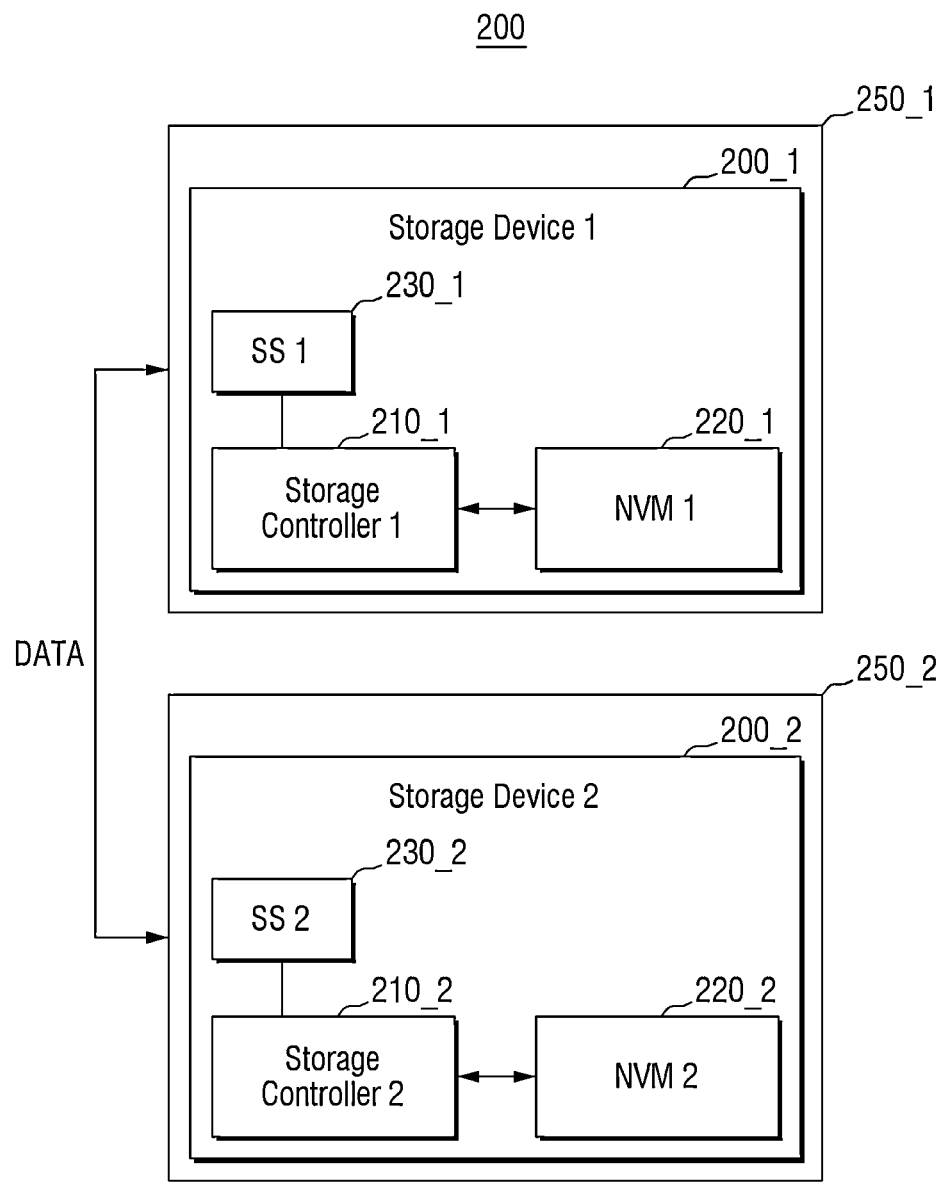
FIG. 3 is an example block diagram for explaining a storage device according to some example embodiments of the present inventive concepts.

FIG. 3 is an example block diagram for explaining a storage device according to some example embodiments of the present inventive concepts.

Referring to FIG. 3, the storage device 200 may include a first storage device 200_1 and a second storage device 200_2. That is, the storage device 200 (which may be interchangeably referred to as a storage assembly) may include a plurality of storage devices. Although the storage device 200 is shown to include the first storage device 200_1 and the second storage device 200_2 in FIG. 3, the example embodiments are not limited thereto, and the storage device 200 may include different numbers (e.g., quantities) of storage devices depending on some example embodiments.

The first storage device 200_1 and the second storage device 200_2 may be mounted on different PCBs (Printed Circuit Boards) from each other. For example, the first storage device 200_1 is mounted on the first PCB 250_1, and the second storage device 200_2 may be mounted on the second PCB 250_2. That is, the first PCB 250_1 and the second PCB 250_2 may be different PCBs separated (e.g., spaced apart) from each other. For example, the first PCB 250_1 may be a printed circuit board for (e.g., configured to implement) AD (Automotive Drive) functionality of a vehicle (e.g., vehicle 700 shown in FIG. 10), and the second PCB 250_2 may be a printed circuit board for (e.g., configured to implement) IVI (In-Vehicle Infotainment) functionality of a vehicle (e.g., vehicle 700 shown in FIG. 10). For example, the first and second storage devices 200_1 and 200_2 may be bounded on separate, respective first and second PCBs 250_1 and 250_2 that are configured to implement different functionality (e.g., different operations) of a vehicle (e.g., vehicle 700 shown in FIG. 10).

The first storage device 200_1 and the second storage device 200_2 may transmit data to each other in a specific situation (e.g., in response to determination by one or both of the first and second storage devices 200_1 and 200_2 of the occurrence of the specific situation) through the interface. The specific contents will be described later.

The first storage device 200_1 may include a first storage controller 210_1, a first non-volatile memory 220_1, and a first shock sensor t. At this time, the specific operations of the first storage controller 210_1, the first non-volatile memory 220_1, and the first shock sensor 230_1 may be the same as those described in FIG. 1.

The second storage device 200_2 may include a second storage controller 210_2, a second non-volatile memory 220_2, and a second shock sensor 230_2. The first and second shock sensors 230_1 and 230_2 may be different from each other. For example, the first and second shock sensors 230_1 and 230_2 may be separate shock sensors of a common design or structural configuration. For example, the first shock sensor 230_1 and the second shock sensor 230_2 may each include a separate accelerometer used to detect impacts due to detecting excessive acceleration beyond a threshold magnitude. In another example, the first and second shock sensors 230_1 and 230_2 may have different structural configurations and/or may be configured to detect impacts based on different operations. For example, the first shock sensor 230_1 may include an accelerometer used to detect impacts due to detecting excessive acceleration beyond a threshold magnitude, and the second shock sensor 230_2 may include a vibration sensor configured to detect imp-acts due to detecting excessive vibration beyond a threshold amplitude and/or frequency. At this time, the specific operations of the second storage controller 210_2, the second non-volatile memory 220_2, and the second shock sensor 230_2 may be the same as those described in FIG. 1.

Figure 10:
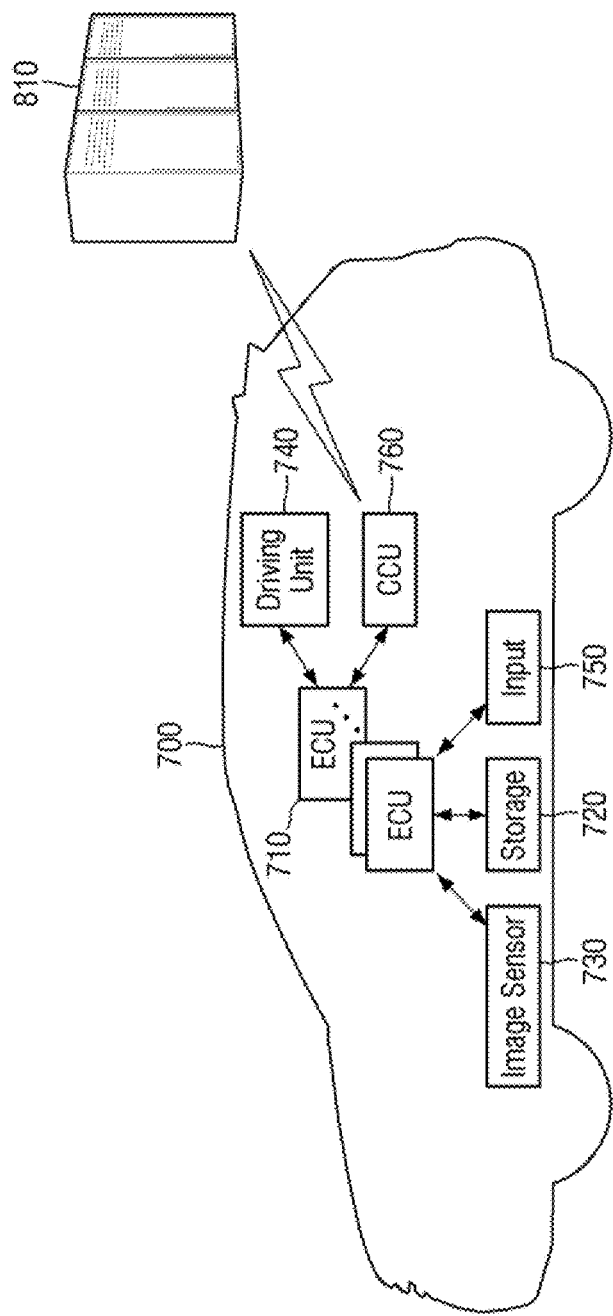
FIG. 10 is a diagram relating to a vehicle including a storage device according to some example embodiments of the present inventive concepts.

In some example embodiments, the first storage device 200_1 and the second storage device 200_2 may store different data from each other, where the different data may be associated with different functionality of a vehicle (e.g., vehicle 700 as shown in FIG. 10). For example, in an autonomous driving vehicle (e.g., vehicle 700 as shown in FIG. 10), the first storage device 200_1 may be included in a vehicle and may store ADAS (Advanced Driver Assistance System) data directly related to autonomous driving as part of the vehicle implementing ADAS functionality thereof, and the second storage device 200_2 in the vehicle may store infotainment data as part of the vehicle implementing infotainment functionality (e.g., providing information and/or entertainment content through audio and/or visual interfaces of the vehicle).

The first storage device 200_1 and the second storage device 200_2 store different data (e.g., different data associated with different functionalities of a vehicle in which the first and second storage devices 200_1 and 200_2 are included), but may transmit the data stored in any one storage device to another storage device in case of a situation such as a vehicle collision. That is, each storage device may use a part of a memory region of another storage device as a backup application for a specific situation.

Figure 4:
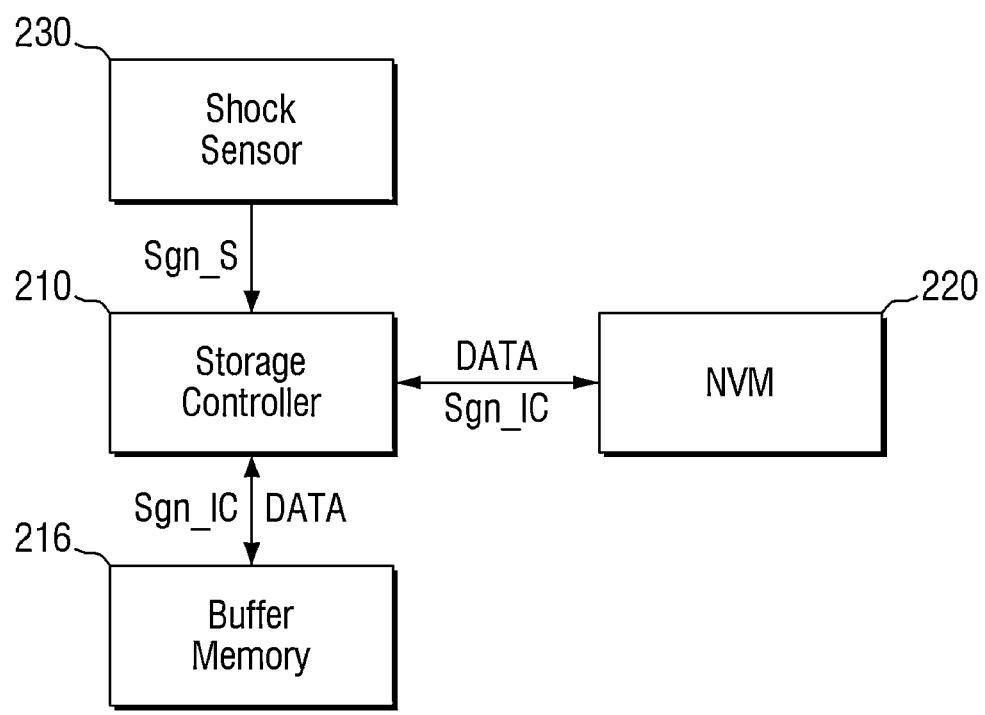
FIG. 4 is an example block diagram for explaining the operation of the storage device according to some example embodiments of the present inventive concepts.

FIG. 4 is an example block diagram for explaining the operation of the storage device according to some example embodiments of the present inventive concepts, and FIG. 5 is a table for explaining the operation of the storage device according to some example embodiments of the present inventive concepts. For convenience of explanation, the configuration and operation will be described from the viewpoint of the first storage device 200_1 of FIG. 3.

Referring to FIGS. 4 and 5, the shock sensor 230 may sense an external physical impact and output a sensor signal Sgn_S according to the impact. The shock sensor 230 may provide the sensor signal Sgn_S to the storage controller 210.

For example, the sensor signal Sgn_S which is output from the shock sensor 230 may have any one of three levels, and may correspond to low, middle, and high, respectively.

That is, the sensor signal Sgn_S may be a voltage signal or a current signal having three levels. However, the example embodiments are not limited thereto, and the number (e.g., quantity) of levels of the sensor signal Sgn_S may vary depending on the specific situations of some example embodiments.

For example, in an autonomous driving vehicle (e.g., vehicle 700 shown in FIG. 10), the shock sensor 230 may output the sensor signal Sgn_S corresponding to the low level. For example, the shock sensor 230 may include an accelerometer and may output (e.g., generate, transmit, etc.) the sensor signal Sgn_S corresponding to the low level in response to determining that an acceleration detected by the accelerometer is below a "low" threshold acceleration magnitude. This corresponds to a case where when the status of the autonomous driving vehicle is normal, that is, it may be a situation in which there may be no external physical impact.

The shock sensor 230 may output the sensor signal Sgn_S corresponding to the middle level. For example, where the shock sensor 230 includes the accelerometer, the shock sensor 230 may output (e.g., generate, transmit, etc.) the sensor signal Sgn_S corresponding to the middle level in response to determining that an acceleration detected by the accelerometer is above the "low" threshold acceleration magnitude and below a separate "high" threshold acceleration magnitude. This corresponds to a case where the status of the autonomous driving vehicle is caution, that is, it may be a situation in which the storage device is not damaged by physical impact, but an occurrence of danger is expected and caution is required, and the storage device internally requires a corresponding appropriate operation.

The shock sensor 230 may output the sensor signal Sgn_S corresponding to the high level. For example, where the shock sensor 230 includes the accelerometer, the shock sensor 230 may output (e.g., generate, transmit, etc.) the sensor signal Sgn_S corresponding to the high level in response to determining that an acceleration detected by the accelerometer is above the "high" threshold acceleration magnitude This corresponds to a case where the status of the autonomous driving vehicle is emergency, and this is, it may be a situation in which there is a high risk of damage to the storage device due to the external physical impact, and there is a need to perform an operation required to preserve the data stored in the storage device accordingly. Where the storage device 200 is included in a vehicle such as an autonomous vehicle, such preservation may enable the functionality associated with such data (e.g., ADAS functionality, infotainment functionality) to continue to be performed with reduced or no interruption, to thus reduce or prevent the risk of an incident such as a malfunction of the vehicle, a collision of the vehicle due to functionality interruption, etc. As result, the safety of operation of the vehicle, and thus the performance of the vehicle, may be improved to maintain at least certain functionality (e.g., ADAS functionality, infotainment functionality, etc.) with reduced or prevention of interruptions despite occurrence of impacts of the storage device 200.

The storage controller 210 receives the sensor signal Sgn_S from the shock sensor 230, and may control the buffer memory 216 and the non-volatile memory 220 on the basis of (e.g., based on, in response to, etc.) the sensor signal Sgn_S. That is, the storage controller 210 may output the internal control signal Sgn_IC that controls the buffer memory 216 and the non-volatile memory 220, and provide (e.g., transmit) it to the buffer memory 216 and the non-volatile memory 220.

For example, the storage controller 210 receives the sensor signal Sgn_S corresponding to the low level from the shock sensor 230, and may output a first internal control signal IC_1 on the basis of the sensor signal Sgn_S and provide it to the buffer memory 216 and the non-volatile memory 220. The storage controller 210 may control the storage device to operate in the normal mode on the basis of the first internal control signal IC_1.

Here, as described in FIG. 1, the normal mode may mean a situation which performs a general operation in which the non-volatile memory 220 stores data DATA, and receives the data DATA from the outside or from the buffer memory 216 and writes the data DATA.

The storage controller 210 is provided with the sensor signal Sgn_S corresponding to the middle level from the shock sensor 230, and may output the second internal control signal IC_2 on the basis of the sensor signal Sgn_S and provide it to the buffer memory 216 and the non-volatile memory 220. The storage controller 210 may control the storage device to perform a data flush on the basis of the second internal control signal IC_2.

Here, the data flush may mean an operation of writing all the data stored in the buffer memory 216 to the non-volatile memory 220. That is, the buffer memory 216 may mean a volatile memory including a DRAM, a SRAM, or the like.

Specifically, the buffer memory 216 may temporarily store data for the performance of the non-volatile memory 220. However, in the caution status, there may be a need for measures to permanently store the data due to the risk of occurrence of impact. As a result, the buffer memory 216 may write all the temporarily stored data in the non-volatile memory 220 on the basis of the second internal control signal IC_2 caused by the sensor signal Sgn_S, without any additional command from the storage controller 210.

The storage controller 210 receives a sensor signal Sgn_S corresponding to a high level from the shock sensor 230, and may output a third internal control signal IC_3 on the basis of the sensor signal Sgn_S and provide it to the buffer memory 216 and the non-volatile memory 220. The storage controller 210 may control the storage device to perform data transmission on the basis of the third internal control signal IC_3.

Here, the data transmission may mean an operation of transmitting all the data stored in the buffer memory 216 and the non-volatile memory 220 to the outside (e.g., external to at least the buffer memory 216 and/or the non-volatile memory 220.

Specifically, the buffer memory 216 may temporarily store the data to be written in the non-volatile memory 220, and the written data may be permanently stored in the non-volatile memory 220. However, since the data may be permanently damaged due to an occurrence of impact in an emergency status, there may be a need for measures to transmit the data to another device and preserve the data therein, to for example reduce or prevent data loss and to enable continued performance of operations and/or functionality associated with such data in a vehicle to reduce or prevent the risk of malfunctions, accidents, collisions or the like that might be associated with the interruption and/or loss of such functionality. Therefore, the buffer memory 216 and the non-volatile memory 220 may transmit all the stored data to an external storage device on the basis of the third internal control signal IC_3 caused by the sensor signal Sgn_S, without any additional command from the storage controller 210, thereby reducing or preventing data loss and thus enabling continued performance of operations and/or functionality associated with such data in a device (e.g., vehicle) to reduce or prevent the risk of malfunctions, accidents, collisions or the like that might be associated with the interruption and/or loss of such functionality resulting from such data loss. That is, the external storage device may mean the second storage device 200_2 described in FIG. 3.

The first storage device 200_1 and the second storage device 200_2 may store different data (e.g., different data associated with different functionalities of a vehicle in which the first and second storage devices 200_1 and 200_2 are included), but may transmit the data stored in any one storage device to another storage device in case of a situation such as a vehicle collision. That is, each storage device may use a part of a memory region of another storage device as a backup application for a specific situation. For example, despite the first storage device 200_1 and the second storage device 200_2 normally storing different data associated with different functionalities (e.g., ADAS and infotainment, respectively) of a vehicle in which the first and second storage devices 200_1 and 200_2 are included, the first storage device 200_1 may transmit first data (which may be associated with ADAS functionality and not infotainment functionality of the vehicle) to be stored at the second storage device 200_2 and/or the second storage device may transmit second data (which may be associated with infotainment functionality and not associated with ADAS functionality of the vehicle) to be stored at the first storage device 200_1. Such transmissions may be restricted to being in response to detection of a specific situation such as an impact and/or excessively high internal temperature of one or more of the first and/or second storage devices 200_1 and/or 200_2. For example, the storage device 200 may be configured to restrict first data (e.g., ADAS functionality-associated data) to be stored at the first storage device 200_1 and not the second storage device 200_2 and for second data (e.g., infotainment functionality-associated data) to be stored at the second storage device 200_2 and not the first storage device 200_1, except in response to detection of a specific situation as described herein (e.g., respective shock sensors 230_1 and/or 230_2 detecting an impact of one or more of the first and/or second storage devices 200_1 and/or 200_2, respective temperature sensors 240_1 and/or 240_2 detecting excessively high internal temperature of one or more of the first and/or second storage devices 200_1 and/or 200_2, etc.) in which case the storage device 200 may respond to such a specific situation detection by causing first data to be transmitted from the first storage device 200_1 to be stored at the second storage device 200_1 and/or for second data to be transmitted from the second storage device 200_2 to be stored at the first storage device 200_1.

Where the storage device 200 included in a vehicle, and various functionality of the vehicle (e.g., ADAS functionality, infotainment functionality, etc.) is performed based on data stored at any of the storage devices included therein (e.g., first and/or second storage devices 200_1 and/or 200_2), the vehicle may be configured to perform a given functionality based on data associated with the functionality that is stored in the storage device 200 regardless of which of the storage devices 200_1 and/or 200_2 the data is stored in. For example, where the storage device 200 in an autonomous vehicle is configured to normally store first data associated with an ADAS functionality of the autonomous vehicle in the first storage device 200_1 and not in the second storage device 200_2, the vehicle may be configured to normally perform the ADAS functionality based on the first data stored in the first storage device 200_1 and not based on data stored in the second storage device 200_2. In situations where first data is caused to be transmitted from the first storage device 200_1 to be stored at the second storage device 200_2, for example in response to a detection of an impact of the first storage device 200_1 by the first shock sensor 230_1, the vehicle may be configured to continue performing the ADAS functionality based on the first data transmitted to and stored at the second storage device 200_2, alone or in combination with first data still stored at the first storage device 200_1, thereby enabling the vehicle to maintain the ADAS functionality with reduced, minimized, or with no interruption of the ADAS functionality, thereby reducing or preventing the risk of a safety incident such as a collision of the vehicle due to ADAS functionality interruption and therefore improving the safety of operation of the vehicle and thus improving the performance and functionality of the vehicle. Accordingly, the performance of the storage device 200 in supporting a functionality of the vehicle with reduced or no interruption and thus with improved performance may be improved, and thus the functionality of the storage device 200 may be understood to be improved based on the first storage device 200_1 and the second storage device 200_2 being configured to transmit data to each other (e.g., the aforementioned first and second data), for example based on respective first and/or second shock sensors 230_1 and/or 230_2 detecting impacts of the first and/or second storage devices 200_1 and/or 200_2.

Figure 6:
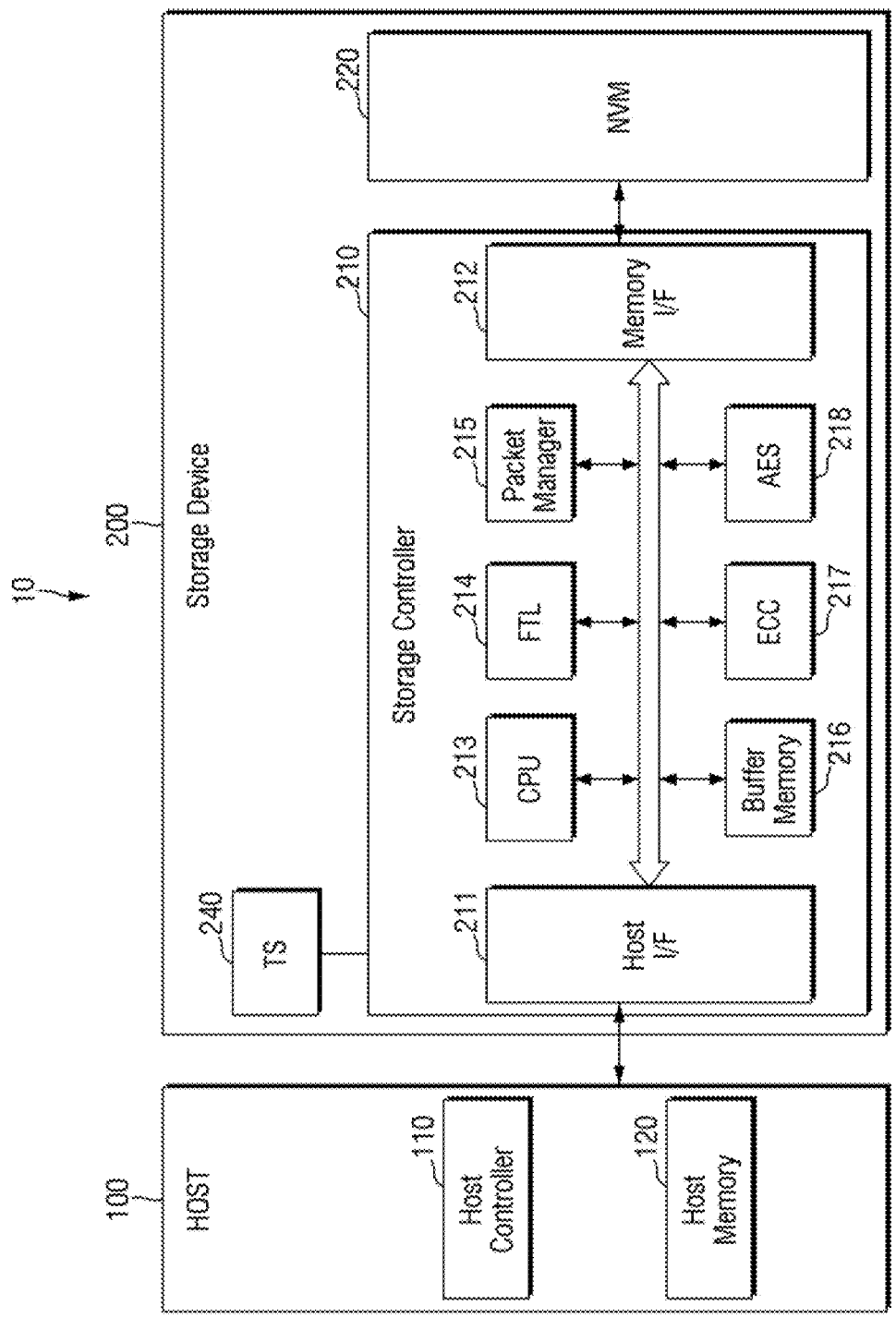
FIG. 6 is a block diagram schematically showing a host-storage system according to some example embodiments of the present inventive concepts.

FIG. 6 is a block diagram schematically showing a host-storage system according to some example embodiments of the present inventive concepts.

Differences from FIG. 1 will be mainly described. The storage device 200 may include a temperature sensor 240.

The temperature sensor 240 (e.g., a thermocouple, thermometer, or the like) may measure the internal temperature of the storage device 200, output (e.g., generate, transmit, etc.) a temperature signal of (e.g., a temperature signal indicating) the measured internal temperature, and provide the temperature signal to the storage controller 210. Specifically, the temperature sensor 240 may measure the operating temperature of the storage device 200 and/or the ambient environment temperature of the storage device 200, and provide a temperature signal indicating the measured temperature to the storage controller 210.

In some example embodiments, although the temperature sensor 240 is shown to be placed outside the storage controller 210 in FIG. 6, some example embodiments is not limited thereto. That is, the temperature sensor 240 may be included in the storage controller 210.

Further, although the storage device 200 is shown to include only the temperature sensor 240, some example embodiments is not limited thereto, and the storage device 200 may include not only the temperature sensor 240 but also the shock sensor 230 of FIG. 1. In this case, the storage controller 210 may generate and output an internal operating signal, on the basis of both the sensor signal from the shock sensor 230 and the temperature signal from the temperature sensor 240.

Figure 7:
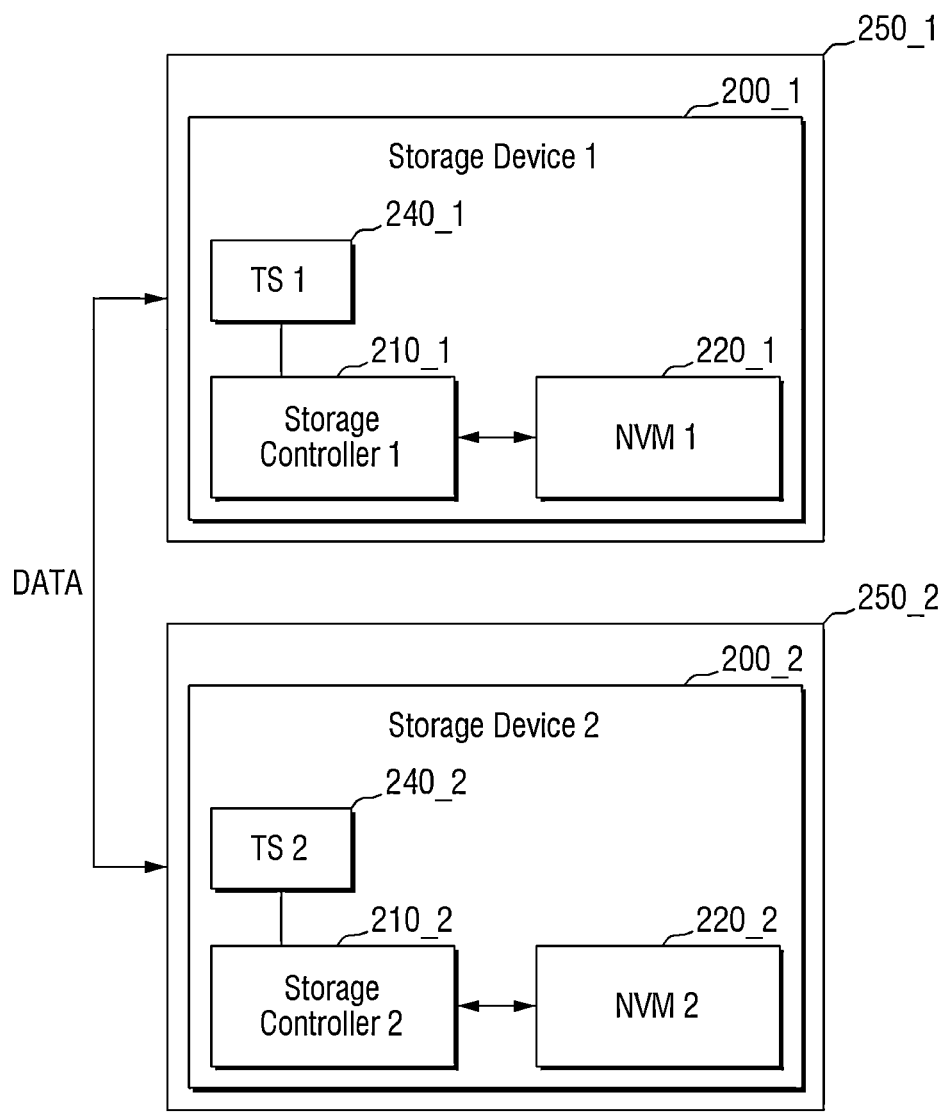
FIG. 7 is an example block diagram for explaining a storage device according to some example embodiments of the present inventive concepts.

FIG. 7 is an example block diagram for explaining a storage device according to some example embodiments of the present inventive concepts.

Differences from FIG. 3 will be mainly described. The storage device 200 may include a first storage device 200_1 including a first temperature sensor 240_1, and a second storage device 200_2 including a second temperature sensor 240_2.

The first temperature sensor 240_1 may measure the internal temperature of the first storage device 200_1 and provide a temperature signal to the first storage controller 210_1, and the second temperature sensor 240_2 may measure the internal temperature of the second storage device 200_2 and provide the temperature signal to the second storage controller 210_2.

The operation of the first storage controller 210_1 and the second storage controller 210_2 on the basis of the temperature signal, the type of data stored in the first storage device 200_1 and the second storage device 200_2, and the relationship placed on the PCB are the same as those described in FIG. 3, and therefore will not be described below.

Figure 8:
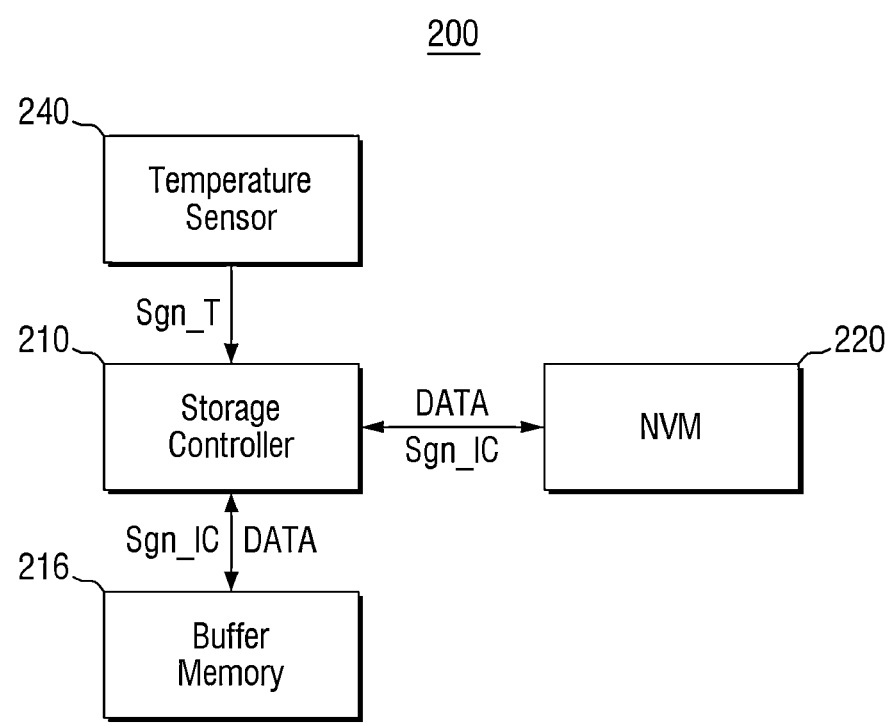
FIG. 8 is an example block diagram for explaining the operation of the storage device according to some example embodiments of the present inventive concepts.

FIG. 8 is an example block diagram for explaining the operation of the storage device according to some example embodiments of the present inventive concepts, and FIG. 9 is a table for explaining the operation of the storage device according to some example embodiments of the present inventive concepts. For convenience of explanation, the configuration and operation will be described from the viewpoint of the first storage device 200_1 of FIG. 7.

Referring to FIGS. 8 and 9, the temperature sensor 240 may measure the internal temperature (e.g., internal temperature value) of the storage device and output a consequent temperature signal Sgn_T indicating the value of the measured internal temperature. The temperature sensor 240 may provide the temperature signal Sgn_T to the storage controller 210.

For example, the temperature signal Sgn_T output from the temperature sensor 240 may have three levels, which may correspond to each of low, middle, and high. That is, the temperature signal Sgn_T may be a voltage signal or a current signal having three levels.

For example, in an autonomous driving vehicle, the temperature sensor 240 may output the temperature signal Sgn_T corresponding to the low level. This may be a status in which the temperature T (also referred to herein as a temperature value) of the autonomous driving vehicle, indicated by the "low level" of the temperature signal Sgn_T, is smaller than a preset first threshold value T1. That is, it may be a situation in which the temperature (e.g., temperature value) of the autonomous driving vehicle and the temperature of the storage device fall within the normal range.

The temperature sensor 240 may output the temperature signal Sgn_T corresponding to the middle level. This may be a status in which the temperature T of the autonomous driving vehicle, indicated by the "middle level" of the temperature signal Sgn_T, is greater than a preset first threshold value T1 and smaller than a preset second threshold value T2. That is, it may be a situation in which the temperatures of the autonomous driving vehicle and the storage device rise slightly, and appropriate measures corresponding to this may be required inside the storage device.

The temperature sensor 240 may output the temperature signal Sgn_T corresponding to the high level. This may be a status in which the temperature T of the autonomous driving vehicle, indicated by the "high level" of the temperature signal Sgn_T, is greater than the second threshold value T2. That is, this may be a situation in which the temperatures of the autonomous driving vehicle and the storage device rise significantly, there is a risk of damage to the storage device, and there is a need to perform the necessary operations for preserving the data stored in the storage device accordingly. Where the storage device 200 is included in a vehicle such as an autonomous vehicle, such preservation may enable the functionality associated with such data (e.g., ADAS functionality, infotainment functionality) to continue to be performed with reduced or no interruption, to thus reduce or prevent the risk of an incident such as a malfunction of the vehicle, a collision of the vehicle due to functionality interruption, etc. As result, the safety of operation of the vehicle, and thus the performance of the vehicle, may be improved to maintain at least certain functionality (e.g., ADAS functionality, infotainment functionality, etc.) with reduced or prevention of interruptions despite occurrence of significant temperature rise in the storage device 200.

In addition, although FIG. 9 shows that only the first threshold value T1 and the second threshold value T2 are set and the temperature sections are three, this is merely for convenience of explanation, and some example embodiments is not limited thereto. That is, the preset threshold value may differ depending on the specific situations of some example embodiments.

The storage controller 210 receives a temperature signal Sgn_T from the temperature sensor 240, and may control the buffer memory 216 and the non-volatile memory 220 based on the temperature signal Sgn_T. That is, the storage controller 210 may output the internal control signal Sgn_IC that controls the buffer memory 216 and the non-volatile memory 220, and provide it to the buffer memory 216 and the non-volatile memory 220.

For example, the storage controller 210 may receive a temperature signal Sgn_T corresponding to a low level from the temperature sensor 240 to output a first internal control signal IC_1 based on this, may receive a temperature signal Sgn_T corresponding to a middle level to output the second internal control signal IC_2 based on this, or may receive a temperature signal Sgn_T corresponding to the high level to output the third internal control signal IC_1 based on this.

The contents in which the storage controller 210 provides the first to third internal control signals IC_1 to IC_3 to the buffer memory 216 and the non-volatile memory 220 to perform the operation corresponding to each status are the same as those described in FIGS. 4 and 5, and therefore will not be described below.

As described above, even if an external physical impact occurs, the storage device according to some example embodiments of the present inventive concepts can protect the stored data, by performing the internal operation corresponding to each situation in response to the sensor signal output from the shock sensor and/or the temperature signal output from the temperature sensor. In particular, when there is a risk of damage to the storage device, data loss may be reduced or prevented by transmitting the stored data to another storage device. As described herein, such reduction or prevention of data loss may enable reduced or prevented interruption of functionality of a device (e.g., a vehicle) that uses such data to perform the functionality, which may improve performance (e.g., improve safe operation) of the device (e.g., the vehicle).

FIG. 10 is a diagram relating to a vehicle including a storage device according to some example embodiments of the present inventive concepts.

Referring to FIG. 10, a vehicle 700 may include a plurality of electronic control units (ECU) 710, and a storage device 720.

Each electronic control unit of the plurality of electronic control units 710 is electrically, mechanically, and communicatively connected to at least one of the plurality of devices provided in the vehicle 700, and may control the operation of at least one device on the basis of any one function execution command.

Here, the plurality of devices may include an image sensor 730 that acquires an image necessary for performing at least one function, a storage device 720 that includes a shock sensor and a temperature sensor, and a driving unit 740 that performs at least one function. For example, the storage device 720 may correspond to a storage device 200 according to any of the example embodiments.

For example, the image sensor 730 may correspond to an automotive image sensor including a unit pixel.

The driving unit 740 may include a fan and compressor of an air conditioner, a fan of a ventilation device, an engine and a motor of a power device, a motor of a steering device, a motor and a valve of a brake device, an opening/closing device of a door or a tailgate, and the like.

The plurality of electronic control units 710 may communicate with the image sensor 730 and the driving unit 740 using, for example, at least one of an Ethernet, a low voltage differential signaling (LVDS) communication, or a local interconnect network (LIN) communication.

The plurality of electronic control units 710 determine whether there is a need to perform the function on the basis of the information acquired through the shock sensor and/or the temperature sensor included in the storage device 720, and when it is determined that there is a need to perform the function, the plurality of electronic control units 710 control the operation of the driving unit 740 that performs the function, and may control an amount of operation on the basis of the acquired information. That is, the shock sensor and/or the temperature sensor included in the storage device 720 may be the same as each of the shock sensor 230 and the temperature sensor 240 described in FIGS. 1 to 9.

The plurality of electronic control units 710 are able to control the operation of the driving unit 740 that performs the function on the basis of the function execution command that is input through the input unit 750, and are also able to check a setting amount corresponding to the information that is input through the input unit 750 and control the operation of the driving unit 740 that performs the function on the basis of the checked setting amount.

Each electronic control unit 710 may control any one function independently, or may control any one function in cooperation with other electronic control units.

For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive navigation information, road image information, and distance information to obstacles in cooperation with the electronic control unit of the vehicle terminal, the electronic control unit of the image acquisition unit, and the electronic control unit of the collision prevention device, and may control the power device, the brake device, and the steering device using the received information, thereby performing the autonomous driving.

A connectivity control unit (CCU) 760 is electrically, mechanically, and communicatively connected to each of the plurality of electronic control units 710, and communicates with each of the plurality of electronic control units 710.

That is, the connectivity control unit 760 is able to directly communicate with a plurality of electronic control units 710 provided inside the vehicle, is able to communicate with an external server, and is also able to communicate with an external terminal through an interface.

Here, the connectivity control unit 760 is able to communicate with the plurality of electronic control units 710, and is able to communicate with a server 810, using an antenna (not shown) and a RF communication.

Further, the connectivity control unit 760 may communicate with the server 810 by wireless communication. At this time, the wireless communication between the connectivity control unit 760 and the server 810 may be performed through various wireless communication methods such as a GSM (global System for Mobile Communication), a CDMA (Code Division Multiple Access), a WCDMA (Wideband Code Division Multiple Access), a UMTS (universal mobile telecommunications system), a TDMA (Time Division Multiple Access), and an LTE (Long Term Evolution), in addition to a Wifi module and a Wireless broadband module.

As described herein, any devices, systems, blocks, modules, units, controllers, circuits, apparatus, and/or portions thereof according to any of some example embodiments (including, without limitation, any of the example embodiments of the host-storage system 10, the host 100, the host controller 110, the host memory 120, the storage device 200, the storage controller 210, the host interface 211, the memory interface 212, the CPU 213, the flash translation layer (FTL) 214, the packet manager 215, the buffer memory 216, the ECC (error correction code) 217 engine, the AES (advanced encryption standard) 218 engine, the non-volatile memory 220, the shock sensor 230, the controller interface circuit 212a, the memory interface circuit 212b, the control logic circuit 510, the memory cell array 520, the first PCB 250_1, the first storage device 200_1, the first storage controller 210_1, the first non-volatile memory device 220_1, the first shock sensor 230_1, the second PCB 250_2, the second storage device 200_2, the second storage controller 210_2, the second non-volatile memory device 220_2, the second shock sensor 230_2, the temperature sensor 240, the first temperature sensor 240_1, the second temperature sensor 240_2, the vehicle 700, one or more or all of the plurality of ECUs 710, the storage device 720, the image sensor 730, the driving unit 740, the input unit 750, the CCU 760, the server 810, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, blocks, modules, units, controllers, circuits, apparatuses, and/or portions thereof according to any of some example embodiments, and/or any portions thereof, including for example some or all operations of any of the methods and/or processes shown in any of the drawings.

Any of the memories described herein, including, without limitation, any of the example embodiments of the host memory 120, the storage device 200, the buffer memory 216, the non-volatile memory 220, the memory cell array 520, the first storage device 200_1, the first non-volatile memory 220_1, the second storage device 200_2, the second non-volatile memory 220_2, the storage device 720, any portion thereof, or the like may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

Some example embodiments of the present inventive concepts have been described above with reference to the accompanying drawings, but the present inventive concepts are not limited thereto and may be implemented in various different forms. It will be understood that the present inventive concepts can be implemented in other specific forms without changing the technical spirit or gist of the present inventive concepts. Therefore, it should be understood that the example embodiments set forth herein are illustrative in all respects and not limiting.

What is claimed is:

1. A storage device, comprising:
   a first storage device mounted on a first PCB (Printed Circuit Board), the first storage device configured to store first data used in a first operation of a vehicle; and
   a second storage device mounted on a second PCB, the second PCB separated from the first PCB, the second storage device configured to store second data used in a second operation of the vehicle different from the first operation,
   wherein the first storage device includes
      a first storage controller configured to perform the first operation using the first data stored in the first storage device, and
      a first sensor that is configured to
         sense an impact of the first storage device, and
         output a first sensor signal in response to sensing the impact of the first storage device,
   wherein the second storage device includes
      a second storage controller configured to perform the second operation using the second data stored in the second storage device, and
      a second sensor that is configured to
         sense an impact of the second storage device, and
         output a second sensor signal in response to sensing the impact of the second storage device,
   wherein the storage device is configured to, in response to detecting the first sensor signal and not detecting the second sensor signal, cause the first storage device to transmit the first data stored in the first storage device to the second storage device to store the first data into the second storage device and the second storage controller is configured to perform the first operation using the first data stored in the second storage device, and
   wherein the storage device is further configured to, in response to detecting the second sensor signal and not detecting the first sensor signal, cause the second storage device to transmit the second data stored in the second storage device to the first storage device to store the second data into the first storage device and the first storage controller is configured to perform the second operation using the second data stored in the first storage device.

2. The storage device of claim 1, wherein the first storage device is configured to transmit the first data stored in the first storage device to the second storage device to control the second storage controller to continue the first operation using the first data stored in the second storage device.

3. The storage device of claim 1, wherein
the first storage device includes a non-volatile memory storing the first data,
the first storage controller is configured to output a first internal control signal to the non-volatile memory in response to the first sensor signal, and
the non-volatile memory is configured to transmit the first data stored in the non-volatile memory to the second storage device in response to the first internal control signal without an additional command from the first storage controller.

4. The storage device of claim 3, wherein
the first storage device further includes a buffer memory storing at least a portion of the first data, and
the buffer memory is configured to transmit the stored portion of the first data in the buffer memory to the second storage device in response to the first internal control signal without an additional command from the first storage controller.

5. The storage device of claim 1, wherein
the first data includes ADAS (Advanced Driver Assistance System) data,
the first operation includes a driving operation of the vehicle,
the second data includes IVI (In-Vehicle Infotainment) data, and
the second operation includes an infotainment operation of the vehicle.

6. The storage device of claim 1, wherein
the first sensor further includes a temperature sensor that is configured to measure an internal temperature of the first storage device and output a temperature signal based on measuring the internal temperature of the first storage device, and
the first storage controller is configured to output a first internal control signal that controls an internal operation of the first storage device, and the first storage controller is further configured to output a second internal control signal that is different from the first internal control signal based on the temperature signal.

7. The storage device of claim 6, wherein
the first storage controller is configured to output the second internal control signal in response to the temperature signal indicating a temperature value that is greater than a first threshold value, and
the first storage device is configured to transmit the first data stored in the first storage device to the second storage device in response to the second internal control signal.

8. The storage device of claim 1, wherein
the first sensor includes a shock sensor that is configured to measure a value of acceleration magnitude of the first storage device and output the first sensor signal in response to the value of acceleration magnitude being greater than a first threshold value and output a third sensor signal in response to the value of acceleration magnitude being smaller than the first threshold value,
the first storage controller is configured to output a first internal control signal in response to the first sensor signal and output a second internal control signal in response to the third sensor signal,
the first storage device is configured to transmit the first data stored in the first storage device to the second storage device in response to the first internal control signal, and
the first storage device is configured not to transmit the first data stored in the first storage device to the second storage device in response to the second internal control signal.

9. The storage device of claim 8, wherein
the first sensor is further configured to output a fourth sensor signal in response to the value of acceleration magnitude being smaller than the first threshold value and greater than a second threshold value,
the first storage controller is further configured to output a third internal control signal in response to the fourth sensor signal, and
the first storage device is further configured to flush data stored in a volatile memory of the first storage device into a non-volatile memory of the first storage device in response to the third internal control signal.

10. A storage device, comprising:
a first sensor configured to
  detect an external impact of the storage device,
  output a sensor signal having a first level in response to detecting the external impact of the storage device, and
  output a sensor signal having a second level in response to not detecting the external impact of the storage device;
a storage controller configured to output an internal control signal to control an internal operation of the storage device based on a level of the sensor signal;
a buffer memory configured to temporarily store first data based on the internal control signal or transmit the temporarily stored first data based on the internal control signal;
a non-volatile memory configured to store the first data used in a first operation of a vehicle; and
an external storage device that is external to at least the buffer memory or the non-volatile memory, the external storage device including a second sensor configured to detect an external impact of the external storage device, the external storage device configured to store second data used in a second operation of the vehicle different from the first operation,
wherein the storage controller is configured to
  perform the first operation of the vehicle using the first data stored in the storage device,
  output a first internal control signal based on a determination that the sensor signal has the first level, and
  output a second internal control signal based on a determination that the sensor signal has the second level,
wherein the non-volatile memory and the buffer memory are configured to be controlled by the first internal control signal and the second internal control signal, and
wherein the storage device is configured to, in response to detecting the output of the first internal control signal by the storage controller and not detecting the external impact of the external storage device by the second sensor, cause the non-volatile memory to transmit the first data stored inside the non-volatile memory to the external storage device to cause the external storage device to store the first data and continue the first operation using the first data stored in the external storage device, and wherein the storage device is further configured to, in response to detecting the external impact of the external storage device by the second sensor and not detecting the output of the first internal control signal by the storage controller, cause the external storage device to transmit the second data stored inside the external storage device to the non-volatile memory to cause the non-volatile memory to store the second data and perform the second operation using the second data stored in the non-volatile memory.

11. The storage device of claim 10, wherein the non-volatile memory is configured to operate in a normal mode which is not transmitting the first data stored inside the non-volatile memory to the external storage device in response to the output of the second internal control signal by the storage controller.

12. The storage device of claim 10, wherein
the first sensor is further configured to output a sensor signal having a third level,
the storage controller is further configured to output a third internal control signal based on a determination that the sensor signal has the third level, and
the buffer memory is further configured to write data stored in the buffer memory to the non-volatile memory in response to the output of the third internal control signal by the storage controller.

13. The storage device of claim 10, wherein the buffer memory is further configured to transmit data stored in the buffer memory to the external storage device in response to the output of the first internal control signal by the storage controller.

14. The storage device of claim 10, further comprising:
a temperature sensor configured to measure a temperature of the non-volatile memory and to output a temperature signal based on measuring the temperature of the non-volatile memory,
wherein the storage controller is further configured to output a third internal control signal different from the first internal control signal and the second internal control signal based on the temperature signal.

15. The storage device of claim 14, wherein
the storage controller is further configured to output the third internal control signal in response to the temperature signal indicating a temperature value that is smaller than a first threshold value, and
the buffer memory and the non-volatile memory are further configured to operate in a normal mode in response to the third internal control signal.

16. The storage device of claim 10, wherein the non-volatile memory is further configured to transmit the first data stored inside the non-volatile memory to the external storage device without an additional command from the storage controller.

17. The storage device of claim 10, wherein
the first data includes ADAS (Advanced Driver Assistance System) data, and
the first operation includes a driving operation of the vehicle.

18. A vehicle, comprising:
an electronic control unit; and
first and second storage devices connected to the electronic control unit,
wherein the first storage device is mounted on a first PCB (Printed Circuit Board), the first storage device is configured to store first data used in a first operation of the vehicle,
wherein the second storage device is mounted on a second PCB, the second PCB is separated from the first PCB, and the second storage device is configured to store second data used in a second operation of the vehicle different from the first operation,
wherein the first storage device includes
a first storage controller configured to perform the first operation using the first data stored in the first storage device, and
a first sensor which is configured to
sense an impact of the first storage device, and
output a first sensor signal in response to sensing the impact of the first storage device,
wherein the second storage device includes
a second storage controller configured to perform the second operation using the second data stored in the second storage device, and
a second sensor which is different from the first sensor, and is configured to
sense an impact of the second storage device, and
output a second sensor signal in response to sensing the impact of the second storage device,
wherein the electronic control unit is configured to, in response to detecting the first sensor signal and not detecting the second sensor signal, cause the first storage device to transmit the first data stored in the first storage device to the second storage device to store the first data into the second storage device and the second storage controller is configured to perform the first operation of the vehicle using the first data stored in the second storage device, and
wherein the electronic control unit is further configured to, in response to detecting the second sensor signal and not detecting the first sensor signal, cause the second storage device to transmit the second data stored in the second storage device to the first storage device to store the second data into the first storage device and the first storage controller is configured to perform the second operation of the vehicle using the second data stored in the first storage device.

* * * * *